(12) United States Patent
Fazeli et al.

(10) Patent No.: US 11,066,153 B2
(45) Date of Patent: Jul. 20, 2021

(54) ELECTRIC NOSE LANDING GEAR ARCHITECTURE

(71) Applicant: GOODRICH CORPORATION, Charlotte, NC (US)

(72) Inventors: Amir Fazeli, Mississauga (CA); Adnan Cepic, Mississauga (CA)

(73) Assignee: Goodrich Corporation, Charlotte, NC (US)

( * ) Notice: Subject to any disclaimer, the term of this patent is extended or adjusted under 35 U.S.C. 154(b) by 67 days.

(21) Appl. No.: 16/592,602

(22) Filed: Oct. 3, 2019

(65) Prior Publication Data
US 2021/0086891 A1    Mar. 25, 2021

Related U.S. Application Data

(60) Provisional application No. 62/903,530, filed on Sep. 20, 2019.

(51) Int. Cl.
| | | |
|---|---|---|
| *B64C 25/22* | (2006.01) | |
| *B64C 25/24* | (2006.01) | |
| *B64C 25/50* | (2006.01) | |

(52) U.S. Cl.
CPC ............. *B64C 25/22* (2013.01); *B64C 25/24* (2013.01); *B64C 25/50* (2013.01)

(58) Field of Classification Search
CPC ................................. B64C 25/22; F15B 15/261
See application file for complete search history.

(56) References Cited

U.S. PATENT DOCUMENTS

| | | | | |
|---|---|---|---|---|
| 1,842,776 | A | * | 1/1932 | Bogoslowsky ......... B64C 25/22 92/25 |
| 9,057,390 | B2 | | 6/2015 | Onishi et al. |
| 9,422,052 | B2 | | 8/2016 | Kondo et al. |
| 9,469,396 | B1 | | 10/2016 | Glas et al. |
| 2005/0082427 | A1 | * | 4/2005 | Seung ..................... B64C 25/24 244/102 R |
| 2007/0262643 | A1 | * | 11/2007 | Garcia ..................... H02J 4/00 307/25 |
| 2011/0180658 | A1 | | 7/2011 | Elliot et al. |
| 2013/0068885 | A1 | * | 3/2013 | Onomichi ............... B64C 25/22 244/102 R |
| 2014/0151501 | A1 | * | 6/2014 | Kondo ..................... B64C 25/22 244/102 R |

(Continued)

FOREIGN PATENT DOCUMENTS

| | | |
|---|---|---|
| EP | 2202870 | 6/2010 |
| EP | 2604514 | 6/2013 |

(Continued)

OTHER PUBLICATIONS

European Patent Office, European Search Report dated Sep. 7, 2020 in Application No. 19215799.8.

*Primary Examiner* — Christopher D Hutchens
(74) *Attorney, Agent, or Firm* — Snell & Wilmer L.L.P.

(57) ABSTRACT

A nose landing gear system is disclosed. In various embodiments, the nose landing gear system includes an electro-hydraulic actuator configured to raise and lower a nose shock strut assembly; a first electro-mechanical actuator configured to steer the nose shock strut assembly; and a second electro-mechanical actuator configured to open and close a fairing door.

10 Claims, 9 Drawing Sheets

(56) References Cited

U.S. PATENT DOCUMENTS

| | | | |
|---|---|---|---|
| 2014/0366522 A1* | 12/2014 | Masutani | F15B 15/18 |
| | | | 60/477 |
| 2016/0280360 A1* | 9/2016 | Gias | B64C 25/26 |
| 2016/0375991 A1* | 12/2016 | Lee | B64C 25/26 |
| | | | 92/27 |
| 2018/0087634 A1* | 3/2018 | Muster | F16H 25/2204 |
| 2018/0208299 A1 | 7/2018 | Hinderhofer et al. | |
| 2019/0002091 A1 | 1/2019 | Tangye et al. | |
| 2019/0152589 A1 | 5/2019 | Evans et al. | |
| 2019/0217945 A1 | 7/2019 | Klode | |

FOREIGN PATENT DOCUMENTS

| | | |
|---|---|---|
| EP | 2604514 | 10/2018 |
| EP | 2192041 | 7/2019 |
| FR | 3066999 | 12/2018 |
| JP | 2009067387 | 4/2009 |

\* cited by examiner

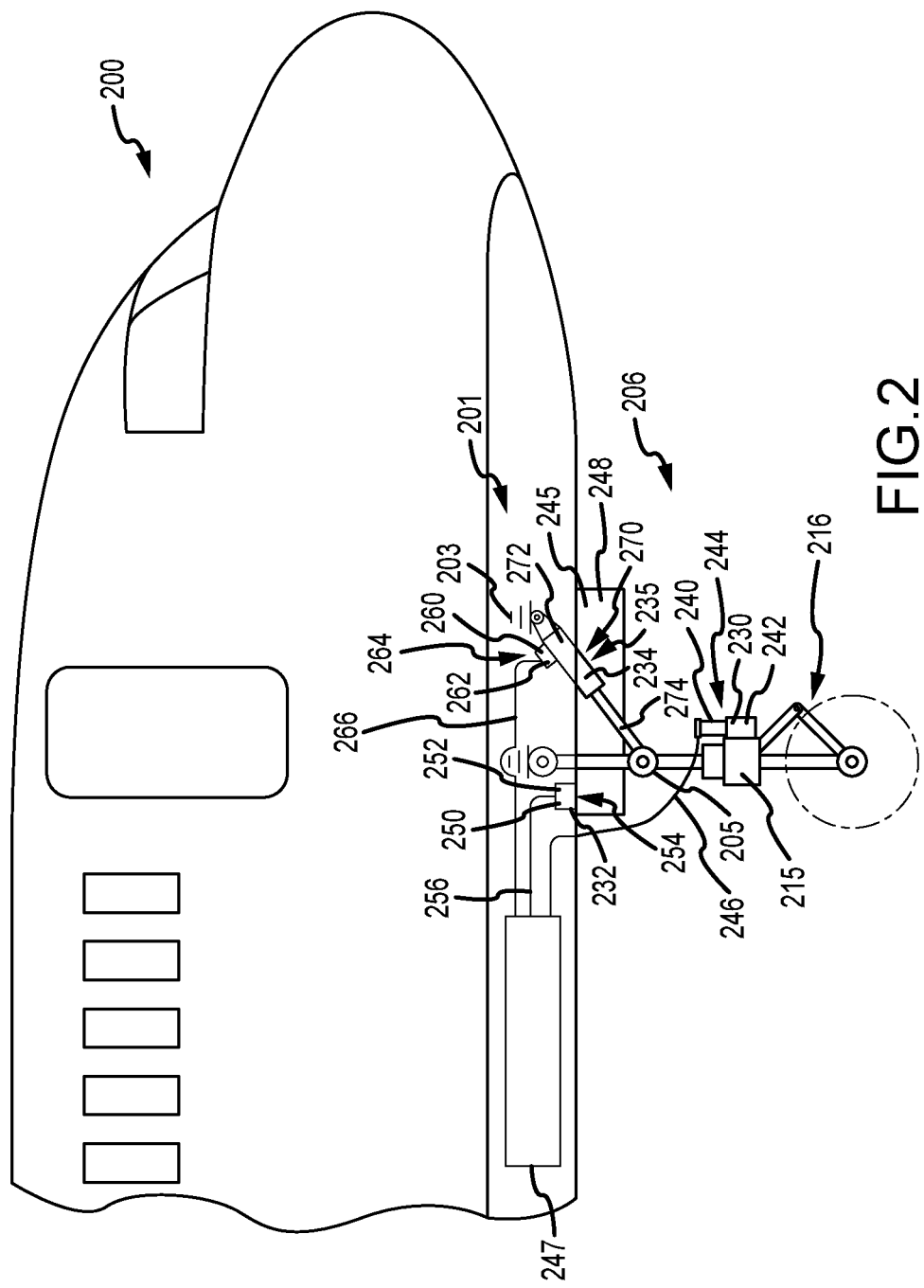

ELECTRIC NOSE LANDING GEAR ARCHITECTURE

CROSS-REFERENCE TO RELATED APPLICATIONS

This is a non-provisional application claiming priority to U.S. Prov. Appl. 62/903,530, entitled "ELECTRIC NOSE LANDING GEAR ARCHITECTURE," filed Sep. 20, 2019, the entirety of which is incorporated by reference herein for all purposes.

FIELD

The present disclosure relates generally to landing gear systems and, more particularly, to electric nose landing gear systems.

BACKGROUND

Aircraft often contain numerous hydraulic systems including, for example, hydraulic systems typically used for the nose and main landing gear systems. The hydraulic pumps for such systems are typically centralized and located aft of the nose region. Transporting pressurized hydraulic fluid from the aft portions of the aircraft to the nose region often involves long networks of hydraulic tubes. The tubes run from near the engines, where pumps pressurize hydraulic fluid using engine power or electrical power provided from an auxiliary source, to the nose of the aircraft, where the pressurized fluid is used to power and steer the nose landing gear.

As a result of the long tubing networks of centralized hydraulic systems, the aircraft carries a large volume of hydraulic fluid to fill the hydraulic tubes used for both supply and return. Carrying extra fluid equates to carrying extra weight and thereby decreases aircraft efficiency. Additionally, the hydraulic tubes occasionally develop leaks over the life of the aircraft. Leaks in the tubing are fixed using labor intensive processes to locate the leak, access the tubing, and replace the tubing.

With regard to the landing gear actuation systems, centralized hydraulic systems are relatively inefficient since the hydraulic systems must also provide the pressure for the landing gear actuation systems continually, despite the fact these systems are generally operated only twice during a flight cycle, that is, before landing and after take-off. Another disadvantage of conventional landing gear actuation systems is the multiplicity of valves employed through which the hydraulic fluid delivered by the central hydraulic supply system is applied to the various actuators of the landing gear actuation system.

SUMMARY

A nose landing gear system is disclosed. In various embodiments, the nose landing gear system includes an electro-hydraulic actuator configured to raise and lower a nose shock strut assembly; a first electro-mechanical actuator configured to steer the nose shock strut assembly; and a second electro-mechanical actuator configured to open and close a fairing door.

In various embodiments, the first electro-mechanical actuator includes a first electric motor and a first gear box connected to a steering collar. In various embodiments, the steering collar is connected to the nose shock strut assembly. In various embodiments, the second electro-mechanical actuator includes a second electric motor and a second gear box connected to the fairing door.

In various embodiments, the electro-hydraulic actuator includes a third electric motor and a hydraulic pump connected to a locking actuator. In various embodiments, the locking actuator includes a cylinder and a piston slidably disposed within the cylinder.

In various embodiments, the locking actuator includes a key configured to engage a first recess disposed within the cylinder while in a first locked position. In various embodiments, the key is configured to engage a second recess disposed within the cylinder while in a second locked position. In various embodiments, the locking actuator includes a bias member configured to bias the key radially outward toward the cylinder.

In various embodiments, the cylinder defines a chamber fluidly coupled to the hydraulic pump, which is configured to provide a hydraulic fluid under pressure to the chamber in order to transition the piston from the first locked position to the second locked position. In various embodiments, the locking actuator includes a first port fluidly coupling the hydraulic pump to the first recess. In various embodiments, the locking actuator includes a second port fluidly coupling the hydraulic pump to the second recess.

In various embodiments, the first electro-mechanical actuator is connected to a power source via a first power cable; the second electro-mechanical actuator is connected to the power source via a second power cable and the electro-hydraulic actuator is connected to the power source via a third power cable.

A method of operating a nose landing gear system is disclosed. In various embodiments, the method includes energizing an electro-hydraulic actuator configured to raise, lower and lock or unlock a nose shock strut assembly; energizing a first electro-mechanical actuator configured to steer the nose shock strut assembly; and energizing a second electro-mechanical actuator configured to open and close a fairing door.

In various embodiments, energizing the first electro-mechanical actuator comprises powering a first electric motor to drive a first gear box connected to a steering collar. In various embodiments, energizing the second electro-mechanical actuator comprises powering a second electric motor connected to the fairing door. In various embodiments, energizing the electro-hydraulic actuator comprises powering a third electric motor connected to a locking actuator via a hydraulic pump. In various embodiments, the third electric motor may be connected to a hydraulic pump, which is connected to a combination of flow or pressure control valves configured to operate the locking actuator.

In various embodiments, the locking actuator includes a cylinder and a piston slidably disposed within the cylinder. In various embodiments, the locking actuator includes a key configured to engage a first recess disposed within the cylinder while in a first locked position and a second recess disposed within the cylinder while in a second locked position. In various embodiments, the cylinder defines a chamber fluidly coupled to a hydraulic pump, which is configured to provide a hydraulic fluid under pressure to the chamber in order to transition the piston from the first locked position to the second locked position.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 2 illustrates mechanical components of an electric nose landing gear architecture, in accordance with various embodiments;

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
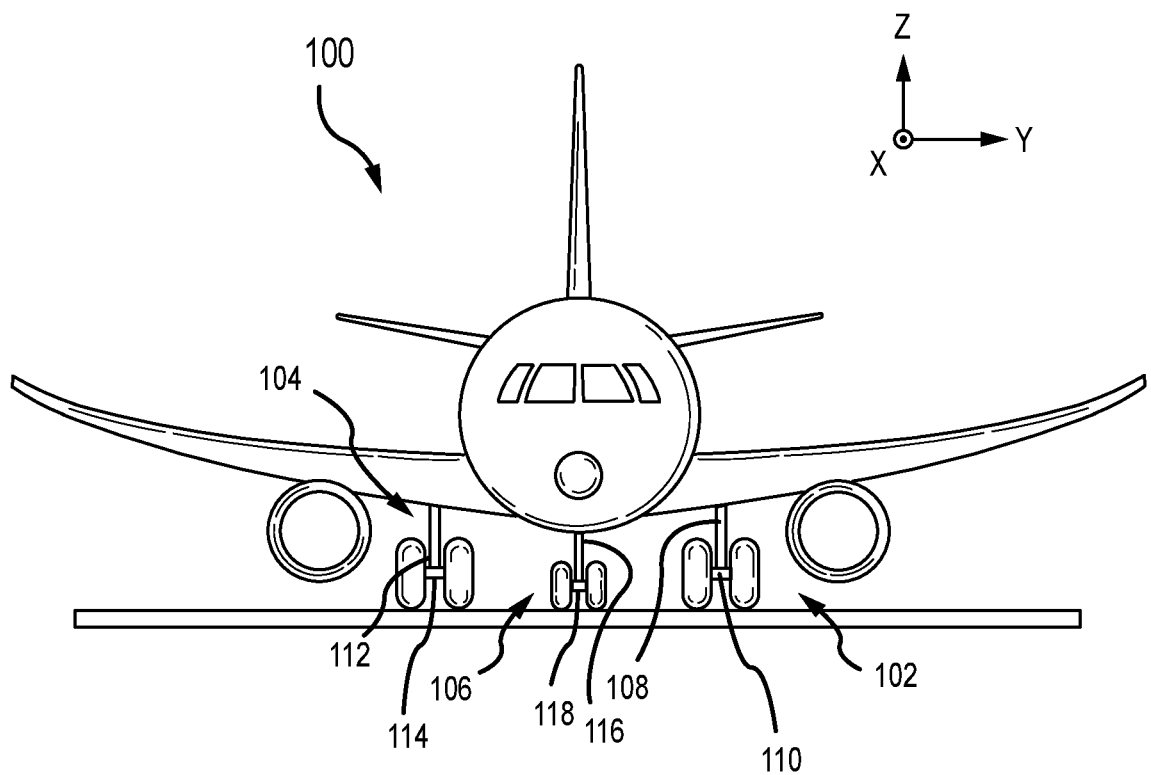
FIG. 1 illustrates an aircraft having a landing gear assembly and wheels mounted thereon, in accordance with various embodiments.

With reference to FIG. 1, an aircraft 100 is illustrated. In accordance with various embodiments, the aircraft 100 may include one or more landing gear assemblies, such as, for example, a left landing gear assembly 102 (or port-side landing gear assembly), a right landing gear assembly 104 (or starboard-side landing gear assembly) and a nose landing gear system 106. Each of the left landing gear assembly 102, the right landing gear assembly 104 and the nose landing gear system 106 may support the aircraft 100 when not flying, allowing the aircraft 100 to taxi, takeoff and land, safely and without damage to the aircraft. In various embodiments, the left landing gear assembly 102 may include a left shock strut assembly 108 and a left wheel assembly 110, the right landing gear assembly 104 may include a right shock strut assembly 112 and a right wheel assembly 114 and the nose landing gear system 106 may include a nose shock strut assembly 116 and a nose wheel assembly 118.

With reference to FIG. 2, an aircraft 200 having a nose landing gear system 206 is illustrated, in accordance with various embodiments. The nose landing gear system 206 includes a steering actuator 230, a door actuator 232, and a retract actuator 234. The steering actuator 230 is connected to a steering collar 215 that is itself connected to a nose shock strut assembly 216 and configured to steer the nose landing gear system 206. In various embodiments, the steering actuator 230 comprises a first electric motor 240 and a first gear box 242 configured to transmit power provided by the first electric motor 240 to the steering collar 215 in order to steer the aircraft 200. In various embodiments, the combination of the first electric motor 240 and the first gear box 242 comprise a first electro-mechanical actuator 244 connected to steering collar 215 and the nose shock strut assembly 216 and configured to steer the aircraft 200. A first power cable 246 provides electrical power from a power source 247 to the first electric motor 240 or to the first electro-mechanical actuator 244.

Still referring to FIG. 2, the door actuator 232 is connected to a door assembly 248 and configured to open and close a fairing door 245 of the door assembly 248 in order to provide access to an interior bay section 201 of the aircraft 200 for the nose landing gear system 206 to be stored when retracted. In various embodiments, the door actuator 232 comprises a second electric motor 250 and a second gear box 252 configured to transmit power provided by the second electric motor 250 to the fairing door 245 in order to open and close the door assembly 248. In various embodiments, the combination of the second electric motor 250 and the second gear box 252 comprise a second electro-mechanical actuator 254 connected to the fairing door 245 and configured to open and close the door assembly 248. A second power cable 256 provides electrical power from the power source 247 to the second electric motor 250 or to the second electro-mechanical actuator 254. In various embodiments, the fairing door 245 may be slaved to the nose shock strut assembly 216 or to one or more other components of the nose landing gear system 206.

Still referring to FIG. 2, the retract actuator 234 is connected to the nose shock strut assembly 216 via a locking actuator 235 and configured to raise and lower the nose shock strut assembly 216 into and out of, respectively, the interior bay section 201 of the aircraft 200. As described in more detail below, the retract actuator 234 may be configured for locking and unlocking the nose shock strut assembly 216 into position, either within the interior bay section 201 for storage or in a deployed configuration for landing or taxiing. In various embodiments, the retract actuator 234 comprises a third electric motor 260 and a hydraulic pump 262 configured to transmit power provided by the third electric motor 260 to the locking actuator 235 in order to raise and lower the nose shock strut assembly 216. In various embodiments, the combination of the third electric motor 260 and the hydraulic pump 262 comprise an electro-hydraulic actuator 264 connected to the locking actuator 235, which is connected via a pivot 205 to the nose shock strut assembly 216 in order to raise and lower the nose shock strut assembly 216. A third power cable 266 provides electrical power from the power source 247 to the third electric motor 260 or to the electro-hydraulic actuator 264. In various embodiments, the locking actuator 235 comprises a piston assembly 270 having a cylinder 272 connected to a mount 203 within the interior bay section 201 of the aircraft 200 and a piston 274 connected to the nose shock strut assembly 216, the piston 274 being slidably disposed within the cylinder 272.

Figure 3A:
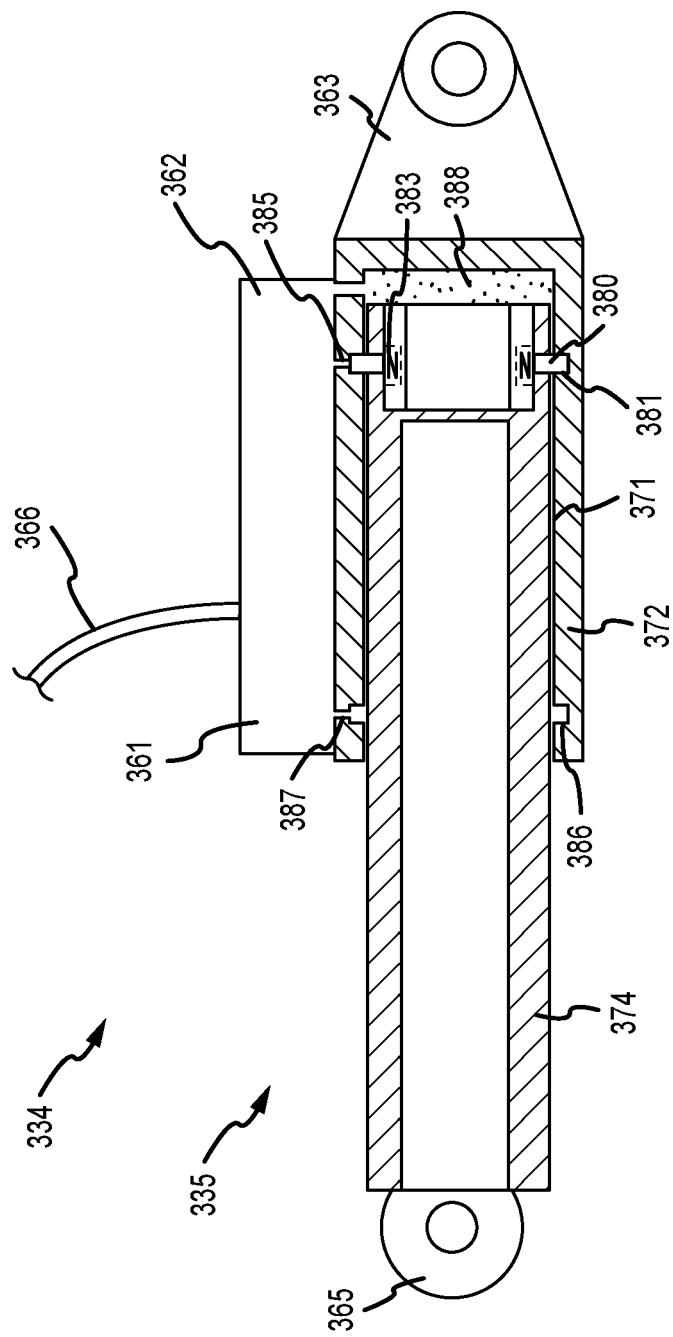
FIGS. 3A, 3B and 3C illustrate an electro-hydraulically powered locking actuator, in accordance with various embodiments.
Figure 3B:
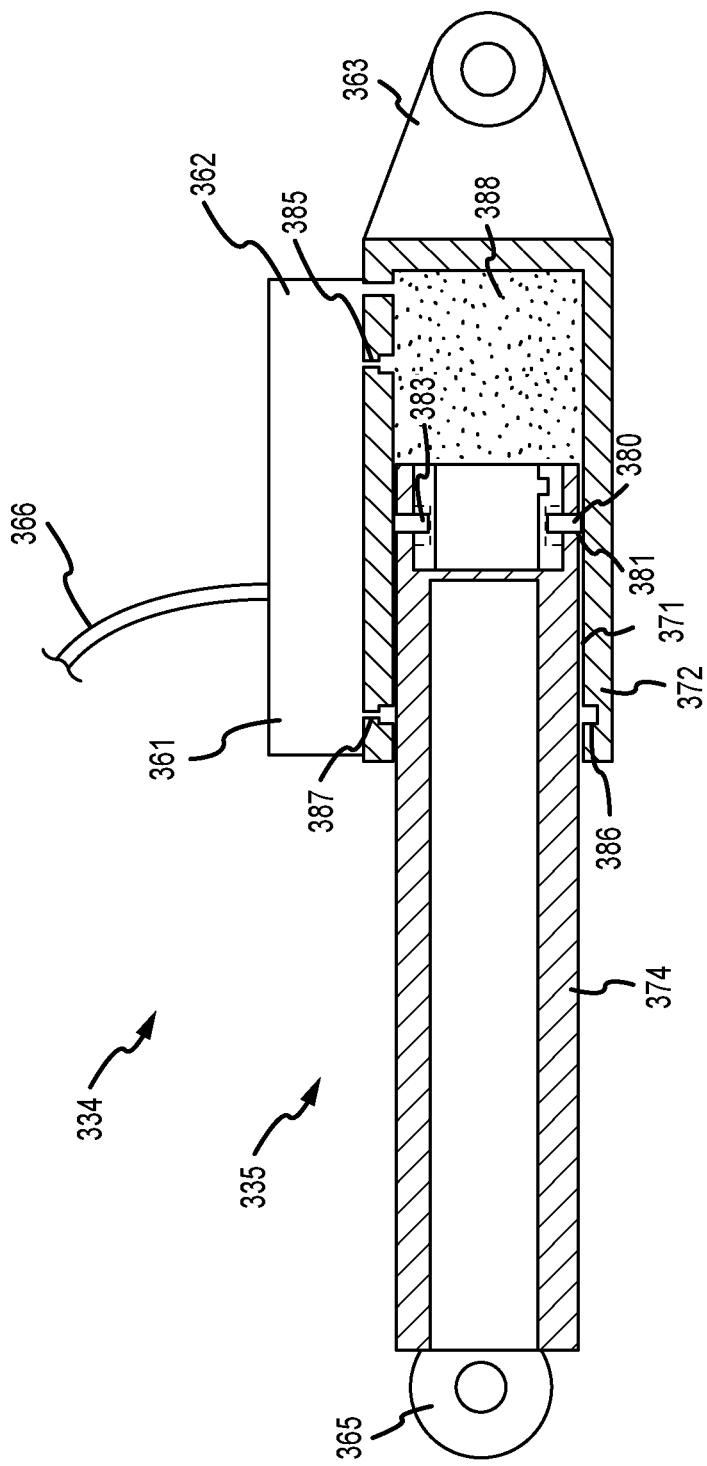
Figure 3C:
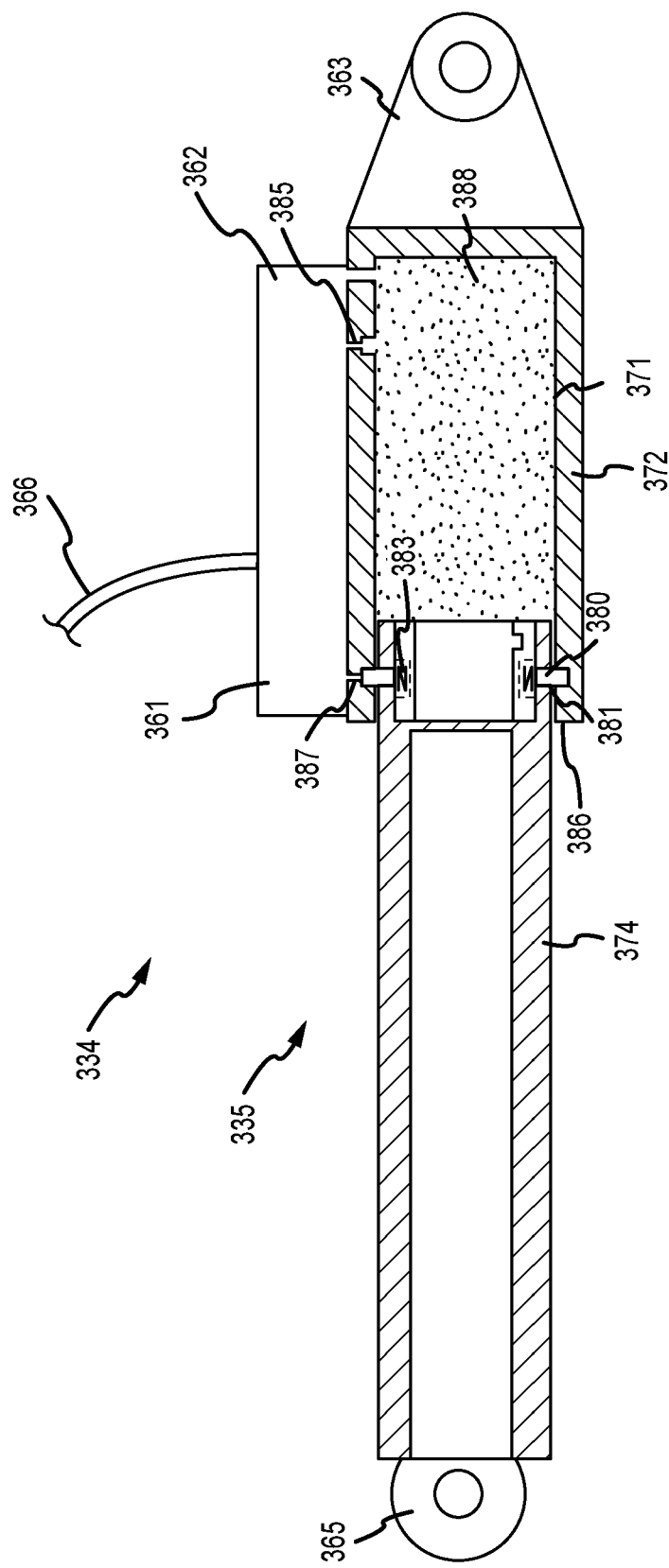

Referring now to FIGS. 3A, 3B and 3C, a retract actuator 334, similar to the retract actuator 234 described above with reference to FIG. 2, is illustrated. In various embodiments, the retract actuator 334 is a locking actuator 335, having a cylinder 372 and a piston 374 slidably disposed within the cylinder 372. The retract actuator 334 includes an electric motor 361 and a hydraulic pump 362 configured to transmit power provided by the electric motor 361 to a shock strut assembly, such as, for example, the nose shock strut assembly 216 described above with reference to FIG. 2, in order to raise and lower the nose shock strut assembly. In various embodiments, the combination of the electric motor 361 and the hydraulic pump 362 comprise an electro-hydraulic actuator 364 configured for connection to the shock strut assembly in order to raise and lower the shock strut assembly into and out of, respectively, an interior bay section of an aircraft, such as, for example, the interior bay section 201 of the aircraft 200 described above with reference to FIG. 2.

In various embodiments, the retract actuator 334 includes a first end 363 configured for attachment to a mount within the interior bay section of the aircraft and a second end 365 configured for connection to the shock strut assembly. The cylinder 372 includes a sleeve 371 that defines an inner diameter of the cylinder 372 and a surface against which the piston 374 may slide between a retracted position (see FIG. 3A) and an extended position (see FIG. 3C). Referring to FIG. 3A, a key 380 (or a plurality of keys) is configured to engage a first recess 381 disposed within the cylinder 372. In various embodiments, the key 380 may be urged radially outward by a first bias member 383 (e.g., a first coil spring) to engage the first recess 381 when positioned radially inward of the first recess 381. Engaging the key 380 with the first recess 381 locks the piston 374 from sliding within the cylinder 372. In various embodiments, a first port 385 may be fluidly coupled to the hydraulic pump 362 and configured to urge the key 380 (or the plurality of keys), via hydraulic pressure, radially inward and away from the first recess 381 in order to disengage the key 380 from the first recess 381, thereby unlocking the retract actuator 334. Similarly, in various embodiments, a second port 387 may be fluidly coupled to the hydraulic pump 362 and configured to urge the key 380 (or the plurality of keys), via hydraulic pressure, radially inward and away from a second recess 386 in order to disengage the key 380 from the second recess 386, thereby unlocking the retract actuator 334.

Still referring to FIGS. 3A, 3B and 3C, the retract actuator 334 assumes a first locked position when fully retracted (see FIG. 3A) and a second locked position when fully extended (see FIG. 3C). When in the first locked position, the key 380 is urged radially outward and into the first recess 381, thereby providing a shear resistance between the key 380 and the first recess 381 that prevents the piston 374 from sliding within the cylinder 372. Similarly, when in the second locked position, the key 380 is urged radially outward and into the second recess 386, thereby providing a shear resistance between the key 380 and the second recess 386 that prevents the piston 374 from sliding within the cylinder 372. A transition position (see FIG. 3B) exists in between the first locked position and the second locked position, where the key 380 slides against the sleeve 371 as the piston 374 moves between the first locked position and the second locked position. A chamber 388 is fluidly coupled to the hydraulic pump 362, which is configured to provide hydraulic fluid under pressure to the chamber 388 in order to transition the piston 374 from the first locked position to the second locked position. Conversely, the hydraulic pump 362 is configured to remove hydraulic fluid under suction from the chamber 388 in order to transition the piston 374 from the second locked position to the first locked position.

Figure 4:
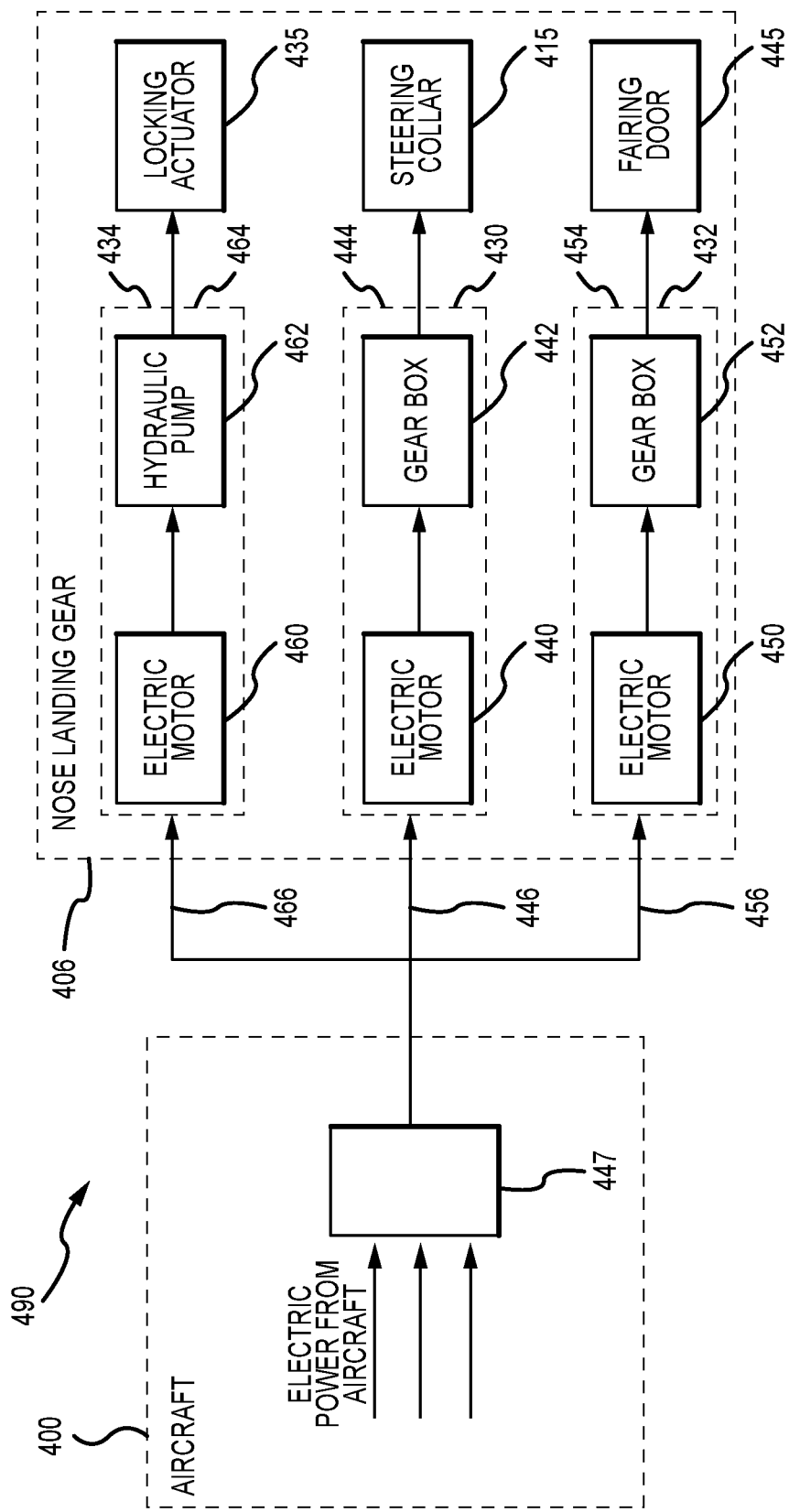
FIG. 4 illustrates system level components of an electric nose landing gear architecture, in accordance with various embodiments.

Referring now to FIG. 4, a system level diagram 490 of components of a nose landing gear system 406 of an aircraft 400, similar to the nose landing gear system 206 of the aircraft 200 described above with reference to FIG. 2, is illustrated, in accordance with various embodiments. The nose landing gear system 406 includes a steering actuator 430, a door actuator 432, and a retract actuator 434, with the retract actuator 434 being configured for locking and unlocking a nose shock strut assembly into position, either within and interior bay section for storage or in a deployed configuration for landing or taxiing. The steering actuator 430 comprises a first electric motor 440 and a first gear box 442 configured to transmit power provided by the first electric motor 440 to a steering collar 415 in order to steer the aircraft 400. In various embodiments, the combination of the first electric motor 440 and the first gear box 442 comprise a first electro-mechanical actuator 444 configured for connection to the steering collar 415 and to steer the aircraft 400. A first power cable 446 provides electrical power from a power source 447 to the first electric motor 440 or to the first electro-mechanical actuator 444.

In various embodiments, the door actuator 432 comprises a second electric motor 450 and a second gear box 452 configured to transmit power provided by the second electric motor 450 to a fairing door 445 in order to open and close a door assembly, such as, for example, the door assembly 248 described above with reference to FIG. 2. In various embodiments, the combination of the second electric motor 450 and the second gear box 452 comprise a second electro-mechanical actuator 454 connected to the fairing door 445 and configured to open and close the door assembly. A second power cable 456 provides electrical power from the power source 447 to the second electric motor 450 or to the second electro-mechanical actuator 454.

In various embodiments, the retract actuator 434 is connected to or, as described above, comprises a locking actuator 435, which is itself connected to a nose shock strut assembly and configured to raise and lower the nose shock strut assembly into and out of, respectively, an interior bay section of the aircraft 400. The nose shock strut assembly and the interior bay section are similar to the nose shock strut assembly 216 and the interior bay section 201 described above with reference to FIG. 2. In various embodiments, the retract actuator 434 comprises a third electric motor 460 and a hydraulic pump 462 configured to transmit power provided by the third electric motor 460 to the locking actuator 435 in order to raise and lower the nose shock strut assembly. In various embodiments, the combination of the third electric motor 460 and the hydraulic pump 462 comprise an electro-hydraulic actuator 464. A third power cable 466 provides electrical power from the power source 447 to the third electric motor 460 or to the electro-hydraulic actuator 464.

Figure 5A:
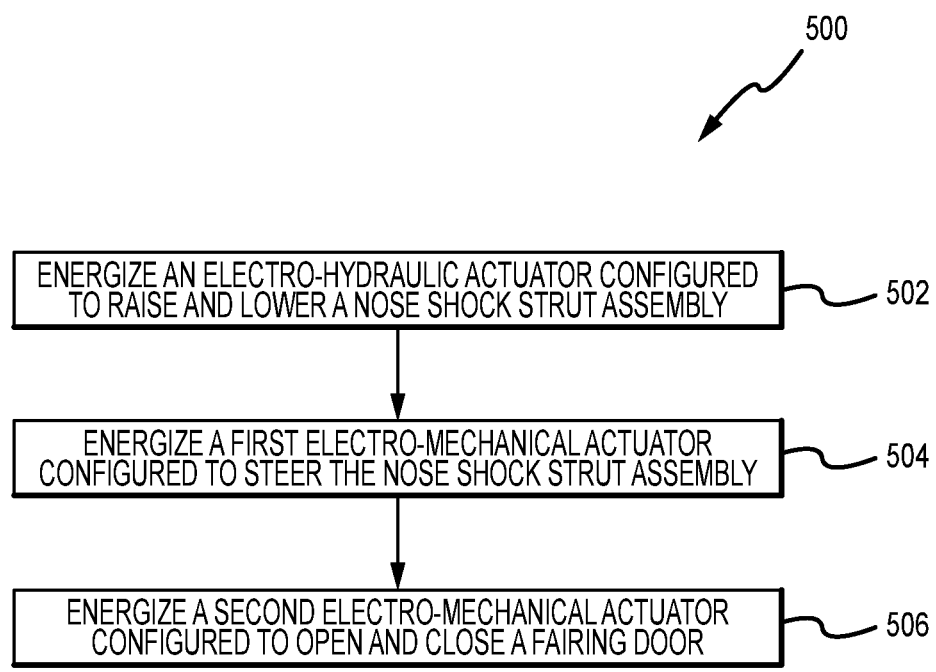
FIG. 5A is a flow chart illustrating a method of operating a nose landing gear system, in accordance with various embodiments.

Referring now to FIG. 5A, a method 500 of operating a nose landing gear system is illustrated. In various embodiments, a first step 502 includes energizing an electro-hydraulic actuator configured to raise and lower a nose shock strut assembly. A second step 504 includes energizing a first electro-mechanical actuator configured to steer the nose shock strut assembly. A third step 506 includes energizing a second electro-mechanical actuator configured to open and close a fairing door. In various embodiments, energizing the first electro-mechanical actuator comprises powering a first electric motor to drive a first gear box connected to a steering collar. In various embodiments, energizing the second electro-mechanical actuator comprises powering a second electric motor connected to the fairing door. In various embodiments, energizing the electro-hydraulic actuator comprises powering a third electric motor connected to a locking actuator. In various embodiments, as described below, the order of operation of the various method steps just outlined may be performed in different sequential steps and, moreover, not all actuators require being energized at the same time, depending on the particular phase of flight the aircraft is undergoing, thereby simplifying operation of the nose landing gear system and conserving energy while operating the system.

Figure 5B:
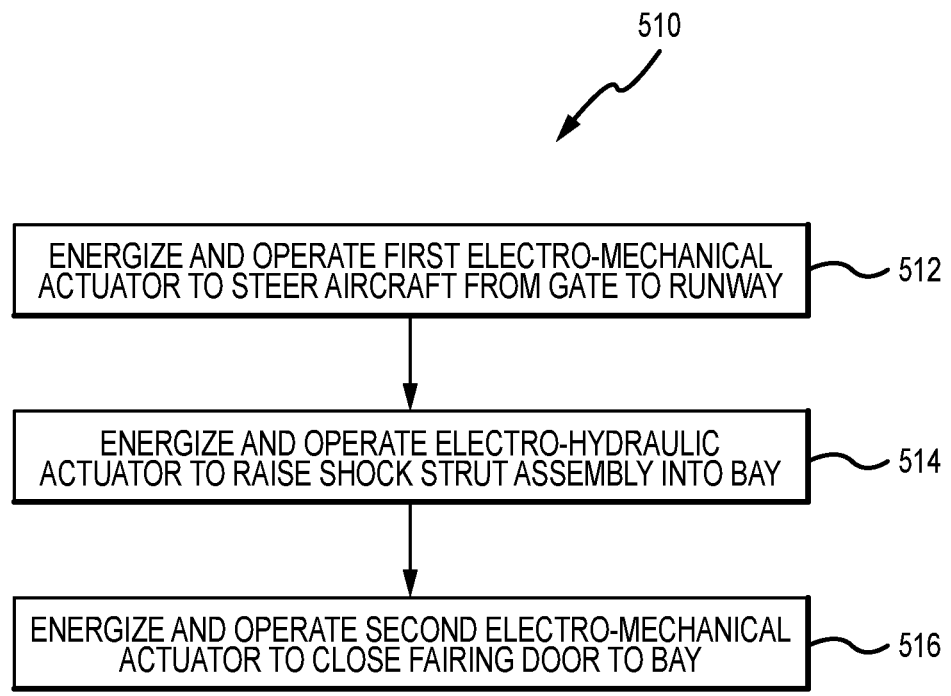
FIG. 5B is a flow chart illustrating a method of operating a nose landing gear system during a takeoff phase of flight, in accordance with various embodiments.

Referring to FIG. 5B, a method 510 of operating a nose landing gear system during a takeoff phase of an aircraft during a flight is illustrated. In various embodiments, a first step 512 includes energizing and operating a first electro-mechanical actuator to steer the aircraft from a gate to a runway. A second step 514 includes energizing and operating an electro-hydraulic actuator to raise a shock strut assembly into a bay. In various embodiments, the second step 514 also includes unlocking a locking actuator configured to lock the shock strut assembly in place for landing or taxiing; the locking actuator may then be relocked when the shock strut assembly has been retracted into the bay. A third step 516 includes energizing and operating a second electro-mechanical actuator to close a fairing door to the bay.

Figure 5C:
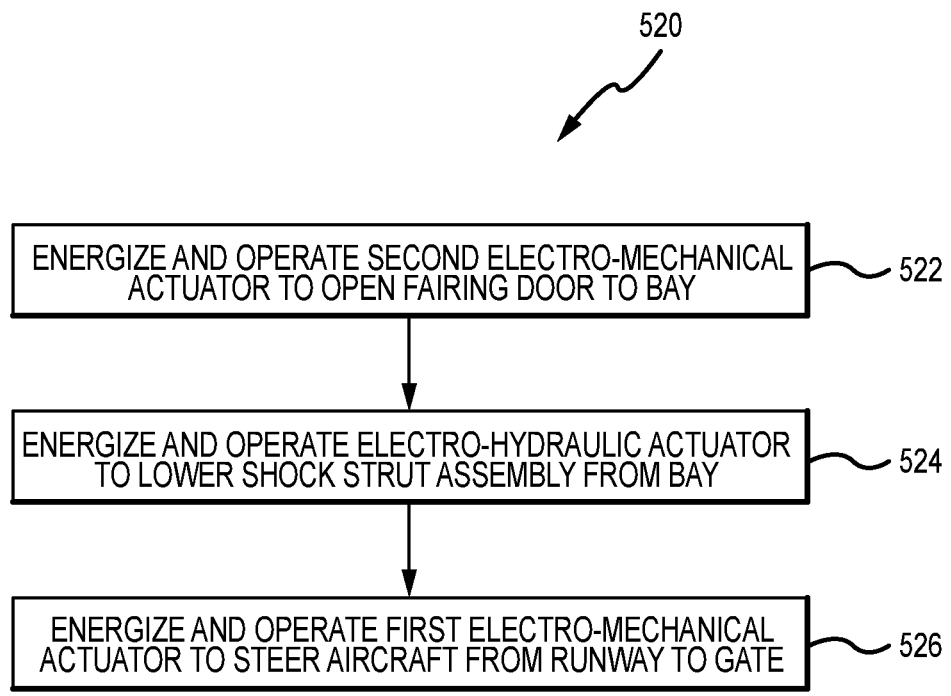
FIG. 5C is a flow chart illustrating a method of operating a nose landing gear system during a landing phase of flight, in accordance with various embodiments

Referring now to FIG. 5C, a method 520 of operating a nose landing gear system during a landing phase of an aircraft during a flight is illustrated. In various embodiments, a first step 522 includes energizing and operating a second electro-mechanical actuator to open a fairing door to a bay. A second step 524 includes energizing and operating an electro-hydraulic actuator to lower a shock strut assembly from the bay. In various embodiments, the second step 524 also includes unlocking a locking actuator configured to lock the shock strut assembly in place within the bay for cruising; the locking actuator may then be relocked when the shock strut assembly has been extracted or deployed from the bay and placed into position for landing. A third step 526 includes energizing and operating a first electro-mechanical actuator to steer the aircraft from a runway to a gate.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A nose landing gear system, comprising:
an electro-hydraulic actuator configured to raise and lower a nose shock strut assembly;
a first electro-mechanical actuator configured to steer the nose shock strut assembly; and
a second electro-mechanical actuator configured to open and close a fairing door,
wherein the first electro-mechanical actuator includes a first electric motor and a first gear box connected to a steering collar,
wherein the steering collar is connected to the nose shock strut assembly,
wherein the second electro-mechanical actuator includes a second electric motor and a second gear box connected to the fairing door,
wherein the electro-hydraulic actuator includes a third electric motor and a hydraulic pump connected to a locking actuator,
wherein the locking actuator includes a cylinder and a piston slidably disposed within the cylinder,
wherein the locking actuator includes a key configured to engage a first recess disposed within the cylinder while in a first locked position,
wherein the key is configured to engage a second recess disposed within the cylinder while in a second locked position,
wherein the locking actuator includes a first port fluidly coupling the hydraulic pump to the first recess and
wherein the hydraulic pump is configured to urge the key radially inward, against the force of a bias member disposed radially inward and in radial alignment with the key, and away from the first recess in order to disengage the key from the first recess and to unlock the locking actuator from the first locked position, thereby allowing the piston to slide within the cylinder.

2. The nose landing gear system of claim 1, wherein the bias member is configured to bias the key radially outward toward the cylinder.

3. The nose landing gear system of claim 2, wherein the cylinder defines a chamber fluidly coupled to the hydraulic pump, which is configured to provide a hydraulic fluid under pressure to the chamber in order to transition the piston from the first locked position to the second locked position.

4. The nose landing gear system of claim 1, wherein the locking actuator includes a second port fluidly coupling the hydraulic pump to the second recess.

5. The nose landing gear system of claim 1, wherein the first electro-mechanical actuator is connected to a power source via a first power cable; the second electro-mechanical actuator is connected to the power source via a second power cable and the electro-hydraulic actuator is connected to the power source via a third power cable.

6. A method of operating a nose landing gear system, comprising:
energizing an electro-hydraulic actuator configured to raise and lower a nose shock strut assembly;
energizing a first electro-mechanical actuator configured to steer the nose shock strut assembly; and
energizing a second electro-mechanical actuator configured to open and close a fairing door,
wherein the first electro-mechanical actuator includes a first electric motor and a first gear box connected to a steering collar,
wherein the steering collar is connected to the nose shock strut assembly,
wherein the second electro-mechanical actuator includes a second electric motor and a second gear box connected to the fairing door,
wherein the electro-hydraulic actuator includes a third electric motor and a hydraulic pump connected to a locking actuator,
wherein the locking actuator includes a cylinder and a piston slidably disposed within the cylinder,
wherein the locking actuator includes a key configured to engage a first recess disposed within the cylinder while in a first locked position,
wherein the key is configured to engage a second recess disposed within the cylinder while in a second locked position,
wherein the locking actuator includes a first port fluidly coupling the hydraulic pump to the first recess and
wherein the hydraulic pump is configured to urge the key radially inward, against the force of a bias member disposed radially inward and in radial alignment with the key, and away from the first recess in order to disengage the key from the first recess and to unlock the locking actuator from the first locked position, thereby allowing the piston to slide within the cylinder.

7. The method of claim 6, wherein energizing the first electro-mechanical actuator comprises powering the first electric motor to drive the first gear box connected to the steering collar.

8. The method of claim 7, wherein energizing the second electro-mechanical actuator comprises powering the second electric motor connected to the fairing door.

9. The method of claim 8, wherein energizing the electro-hydraulic actuator comprises powering the third electric motor connected to the locking actuator via the hydraulic pump.

10. The method of claim 9, wherein the cylinder defines a chamber fluidly coupled to the hydraulic pump, which is configured to provide a hydraulic fluid under pressure to the chamber in order to transition the piston from the first locked position to the second locked position.

* * * * *